United States Patent
Haddadin

(10) Patent No.: US 10,836,051 B2
(45) Date of Patent: Nov. 17, 2020

(54) ROBOT ARM AND ROBOT WRIST

(71) Applicant: FRANKA EMIKA GmbH, Munich (DE)

(72) Inventor: Sami Haddadin, Hannover (DE)

(73) Assignee: Franka Emika GmbH, Munich (DE)

( * ) Notice: Subject to any disclaimer, the term of this patent is extended or adjusted under 35 U.S.C. 154(b) by 155 days.

(21) Appl. No.: 15/752,705

(22) PCT Filed: Aug. 10, 2016

(86) PCT No.: PCT/EP2016/069060
§ 371 (c)(1),
(2) Date: Feb. 14, 2018

(87) PCT Pub. No.: WO2017/029170
PCT Pub. Date: Feb. 23, 2017

(65) Prior Publication Data
US 2018/0243928 A1      Aug. 30, 2018

(30) Foreign Application Priority Data

Aug. 14, 2015   (DE) .................. 10 2015 113 467

(51) Int. Cl.
*B25J 17/02* (2006.01)
*B25J 13/08* (2006.01)
(Continued)

(52) U.S. Cl.
CPC ........... *B25J 17/0291* (2013.01); *B25J 9/046* (2013.01); *B25J 9/06* (2013.01); *B25J 9/126* (2013.01);
(Continued)

(58) Field of Classification Search
CPC ....... B25J 9/04; B25J 9/046; B25J 9/06; B25J 9/065; B25J 9/126; B25J 13/085; B25J 17/0283; B25J 17/0291; B25J 18/06
See application file for complete search history.

(56) References Cited

U.S. PATENT DOCUMENTS

| 5,016,489 A | 5/1991 | Yoda |
| 5,293,107 A | 3/1994 | Akeel |

(Continued)

FOREIGN PATENT DOCUMENTS

| CN | 102395449 A | * | 3/2012 | ................ B25J 9/06 |
| DE | 202010005313 U1 | | 10/2011 | |

(Continued)

OTHER PUBLICATIONS

Cho, Eun-Young; "Summary on the Office Action: Result of Examination", KIPO Examination Bureau; 10-2018-7007407, 9 pages, dated Mar. 29, 2019.

(Continued)

*Primary Examiner* — Adam D Rogers
(74) *Attorney, Agent, or Firm* — Todd A. Serbin; Nexsen Pruet LLC

(57) ABSTRACT

A robot arm comprising a number N of actuator-drivable joint connections $GV_n$, which are connected in series via arm links $GL_i$, where n=1, 2, . . . , N, and i=1, 2, . . . , N−1, and N≥6, wherein the robot arm is configured in such a way that the axes of rotation $R_{GV,N-2}$ and $R_{GV,N-1}$ of each of joint connections $GV_{N-1}$, $GV_{N-2}$ intersect at an angle in the range from 50 to 130°, an axis of rotation $R_{GV,N}$ of joint connection $GV_N$, is arranged radially at a constant distance D1 from the axis of rotation $R_{GV,N-1}$, and a sensor is present in the joint connection $GV_{N-1}$ to detect a force or a torque about the axis of rotation $R_{GV,N-1}$.

19 Claims, 3 Drawing Sheets

(51) Int. Cl.
*B25J 9/04* (2006.01)
*B25J 9/06* (2006.01)
*B25J 9/12* (2006.01)

(52) U.S. Cl.
CPC ......... *B25J 13/085* (2013.01); *B25J 17/0283* (2013.01)

(56) References Cited

U.S. PATENT DOCUMENTS

| | | | | |
|---|---|---|---|---|
| 5,781,705 | A * | 7/1998 | Endo | B25J 9/1643 |
| | | | | 318/568.22 |
| 6,267,022 | B1 | 7/2001 | Suzuki | |
| 8,442,686 | B2 * | 5/2013 | Saito | B25J 9/06 |
| | | | | 700/245 |
| 8,677,854 | B2 | 8/2014 | Lundberg | |
| 9,764,480 | B2 * | 9/2017 | Oka | B25J 9/0084 |
| 2011/0107866 | A1 | 5/2011 | Oka et al. | |
| 2012/0011956 | A1 | 1/2012 | Lundberg | |
| 2012/0143353 | A1 | 6/2012 | Kishi | |
| 2012/0272774 | A1 | 11/2012 | Kirihara et al. | |
| 2014/0245856 | A1 | 9/2014 | Kirihara et al. | |
| 2014/0316564 | A1 * | 10/2014 | Nakamura | G05B 19/19 |
| | | | | 700/245 |
| 2015/0045951 | A1 | 2/2015 | Som | |
| 2016/0008988 | A1 * | 1/2016 | Kennedy | B25J 9/06 |
| | | | | 414/738 |
| 2018/0200006 | A1 * | 7/2018 | Kamikawa | A61B 90/50 |
| 2019/0275673 | A1 * | 9/2019 | Kawase | B25J 9/1607 |
| 2019/0299416 | A1 * | 10/2019 | Watanabe | B25J 9/1607 |
| 2019/0299417 | A1 * | 10/2019 | Kusaka | B25J 9/06 |
| 2020/0016760 | A1 * | 1/2020 | Lee | B25J 19/06 |

FOREIGN PATENT DOCUMENTS

| | | |
|---|---|---|
| DE | 202007019624 U1 | 7/2014 |
| EP | 2319664 A1 | 5/2011 |
| EP | 2792456 A2 | 10/2014 |
| EP | 2862679 A1 | 4/2015 |
| EP | 3045273 A1 | 7/2016 |
| JP | 2004347548 A | 12/2004 |
| JP | 2005199375 A | 7/2005 |
| JP | 2006000955 A | 1/2006 |
| JP | 2008073775 A | 4/2008 |
| JP | 2008272883 A | 11/2008 |
| JP | 2011101918 | 10/2009 |
| JP | 2012228761 A | 11/2012 |
| JP | 2012232361 A | 11/2012 |

OTHER PUBLICATIONS

Dombre, Etienne et al.; "Quelques Problèmes de Conception et Commande de Robots Médicaux", Mecanique & Industries 4, Elsevier, pp. 559-563, 2003.
Kraus, Thomas; German Examination Report; 5 pages; DE 10 2015 113 467.5; dated Apr. 12, 2016.
Kraus, Thomas; German Examination Report; 5 pages; DE 10 2015 113 467.5; dated Sep. 16, 2016.
Champion, Jérôme; International Search Report; 6 pages; PCT/EP2016/09060; dated Nov. 25, 2016.
Dombre, Etienne et al.; "Quelques Problèmes de Conception et Commande de Robots Médicaux", Jan. 1, 2013, URL:https://hal.archives-ouvertes.fr/lirmm-00191944/document.
Chablat, Damien; "Pages perso de Damien Chablat", Sep. 1, 2007, URL:http://www.irccyn.ec-nantes.fr/~chablat/Seriel.html.
Examination Report, counterpart Chinese action, dated Jul. 27, 2020, 8 pages (no English translation provided).

* cited by examiner

ROBOT ARM AND ROBOT WRIST

RELATED APPLICATIONS

This application is a U.S. national phase application, claiming priority under 35 U.S.C. 371 to PCT application PCT/EP2016/069060, filed on Aug. 10, 2016, claiming priority to German national application 10 2015 113 467.5, filed on Aug. 14, 2015, the contents of the these applications incorporated by reference as if fully set forth herein in their entirety.

FIELD OF THE INVENTION

The invention relates to the robot field.

BACKGROUND OF THE INVENTION

Previous attempts to solve problems in the field include JP 2008 272883, DE 20 2010 005 313, DE 20 2007 019 624, EP 3 045 273, US 2015/0045951, U.S. Pat. Nos. 8,677,854 and 5,293,107.

DESCRIPTION OF EMBODIMENTS OF THE INVENTION

Figure 1:
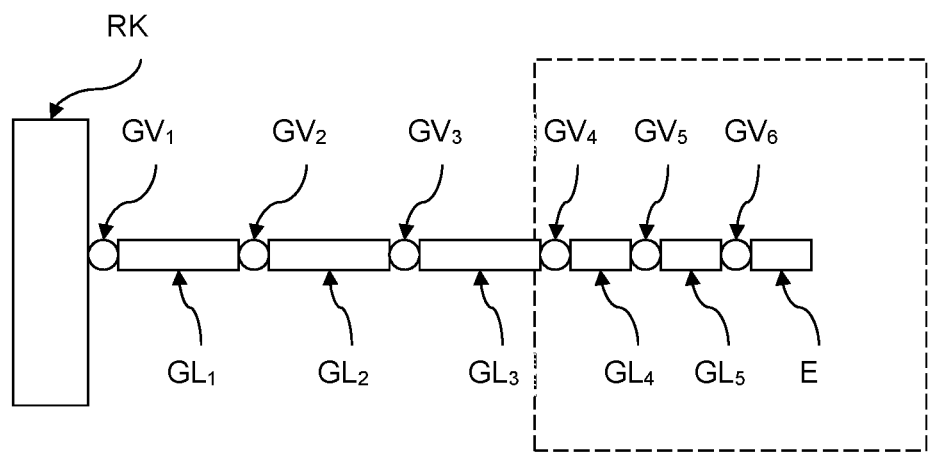
FIG. 1 shows a highly schematic structure of a robot arm according to the invention, with six degrees of freedom (N=6)

The invention relates to a robot arm, having a plurality of arm links, each connected via actuator-drivable joint connections, wherein the proximal arm link of the robot arm can be connected to a robot body via a joint connection, and the distal arm link of the robot arm can be connected to a mountable effector via a joint connection. At a minimum, the last three joint connections of the distal end of the robot arm each enable rotation about an axis of rotation. Such robot arms are known in the prior art.

The invention further relates to a robot wrist, having three actuator-drivable wrist joint connections which are connected in series via two wrist links, wherein the proximal wrist link of the robot wrist can be connected to a robot arm via one of the wrist joint connections, the distal wrist link of the robot wrist can be connected to an effector via another of the wrist joint connections, and each of the three wrist joint connections enables a movement about a wrist axis of rotation assigned to the same. Such robot wrists are also known in the prior art.

Finally, the invention relates to a robot, having a robot arm or a robot wrist.

The problem addressed by the invention is that of designing the robot arm or the robot wrist in such a manner that the handling of the robot arm and/or the robot wrist, in particular for manipulations of objects or the environment above and/or on a work surface, is improved.

The invention is apparent in the features of the independent claims. Advantageous developments and refinements are the subject matter of the dependent claims. Other features, possible applications, and advantages of the invention will become apparent from the following description, along with the explanation of embodiments of the invention, which are illustrated in the figures.

To address a first aspect of the problem, a robot arm is suggested which has a number N of actuator-drivable joint connections $GV_n$, which are connected in series via arm links $GL_i$, where n=1, 2, ..., N, i=1, 2, ..., N−1, and N≥6, wherein the proximal arm link $GL_1$ of the robot arm can be connected to a robot body via the joint connection $GV_1$, the distal arm link $GL_{N-1}$ of the robot arm can be connected to an effector E via the joint connection $GV_N$, the arm links $GL_{N-1}$ and $GL_{N-2}$ are connected via the joint connection $GV_{N-1}$ and the arm links $GL_{N-2}$ and $GL_{N-3}$ are connected via the joint connection $GV_{N-2}$, and each of the joint connections $GV_N$, $GV_{N-1}$, $GV_{N-2}$ enables a movement about an axis of rotation $R_{GV,N}$, $R_{GV,N-1}$, $R_{GV,N-2}$ assigned to the same.

The distal joint connections $GV_N$, $GV_{N-1}$, $GV_{N-2}$, together with the joint connections $GL_{N-2}$, $GL_{N-1}$, form a kind of "wrist," which enables an orientation of the effector E in three degrees of freedom relative to the previous joint connections $GL_{N-3}$ . . . .

The proposed robot arm is characterized in that the robot arm is designed in such a manner that the axes of rotation $R_{GV,N-2}$ and $R_{GV,N-1}$ intersect at an angle in the range from 50 to 130°, or the axes of rotation $R_{GV,N-2}$ and $R_{GV,N-1}$ have a minimum spacing A1 from each other in the range from 1 to 20 mm, the axis of rotation $R_{GV,N}$ is arranged radially at a constant distance D1 to the axis of rotation $R_{GV,N-1}$, and in the joint connection $GV_{N-1}$ to detect a force or a torque about the axis of rotation $R_{GV,N-1}$ (and/or the effective torque about the axis).

The minimum spacing of the axes of rotation $R_{GV,N-2}$ and $R_{GV,N-1}$ is preferably 2 mm, 5 mm, 7 mm, 10 mm, 12 mm, 15 mm or 17 mm. The range of the angle at which the axes of rotation $R_{GV,N-2}$ and $R_{GV,N-1}$ intersect is preferably 50 to 130°, 60 to 120°, 70 to 110°, 80 to 100° or 85 to 95°.

A known force or torque sensor can be present on the output end to detect the force or the torque. However, the sensor can also be designed as a direct drive. In the latter case, the direct drive can be the drive and the sensor simultaneously. Torque is typically estimated by measuring motor current and using known physical relationships. However, a combination of both is explicitly not excluded (direct drive and an output-end sensor to measure acting internal and external forces even more accurately).

The aim in this case is to produce improved sensitivity to acting torques and forces, in particular opposing acting contact forces, via the acting lever.

The number N is advantageously equal to 6 or 7 or 8. It is particularly preferred that the robot arm is, in the latter case (N=7), connected to the robot body by means of the proximal arm link $GL_1$ via the likewise actuator-drivable joint connection $GV_1$, such that the robot arm including the effector E can be controlled about a total of 7 axes $R_{GV1}$, $R_{GV2}$, $R_{GV3}$, $R_{GV4}$, $R_{GV5}$, $R_{GV6}$, and $R_{GV7}$. The three distal joint connections $GV_5$, $GV_6$, $GV_7$, together with the axes of rotation $R_{GV5}$, $R_{GV6}$ and $R_{GV7}$ and the arm links $GL_5$ and $GL_6$, along with the effector E, can be collectively referred to as a manner of "wrist." The 7-axis (N=7) robot arm enables three-dimensional positioning and three-dimensional orientation of the end effector E in the working space of the robot. This means that the robot arm has a working space in which its effector E can reach every point in space in any orientation.

The proximal arm links (for example, for N=6: $GL_1$, $GL_2$ and $GL_3$) are advantageously long arm links, for three-dimensional positioning of the effector E in the working space, to enable positioning of the effector E in the largest possible working space. The distal arm links (for example, for N=6: $GL_4$, $GL_5$ and $GL_6$) are advantageously short arm links, to bring the effector E into a desired orientation in a small space.

The effector (tool) E can be selected from a variety of tools, by way of example a gripper, welding gun, welding tongs, adhesive nozzle, painting nozzle, drilling/milling head, measuring tool, laser cutting head, water jet cutting head, etc., according to the task and requirements. The effector E can be connected directly to the joint connection $GV_N$, or can be connected to the joint connection $GV_N$ via a (rigid) intermediate piece, such as an adapter, for example. The intermediate piece can be designed as a further arm link.

The proposed robot arm has multiple advantages. The spacings D1 and A1 result in levers which enable improved measurement of external forces and/or torques in almost all configurations of the angular joint connections. As such, the spacing D1 enables a detection of external forces and/or torques by means of the sensor present in the joint connection $GV_{N-1}$, even when a force acts along the axis of rotation $R_{GV,N}$. Recognition of external torques about the axis of rotation $R_{GV,N}$ is also possible. Furthermore, in the proposed robot arm, there are no classical singularities in the detection of external torques or forces in the wrist (=distal joint connections $GV_N$, $GV_{N-1}$, $GV_{N-2}$ with the arm links $GL_{N-2}$, $GL_{N-1}$ and the effector E), since the last two axes of rotation $R_{GV,N-1}$ and $R_{GV,N}$ do not intersect. A further advantage relates to a re-configuration of the wrist. This can be achieved to a great extent by moving the wrist alone, such that there is no need to move the entire robot arm.

It is advantageous that a movement of the robot arm with the effector E about the so-called tool center point (TCP=a reference point which is defined at a suitable location on the tool/effector) is possible, particularly in all robot arm configurations, if the axes of rotation $R_{GV,N-2}$ and $R_{GV,N}$ intersect. Even if there is no intersection, the closer the axes of rotation $R_{GV,N-2}$ and $R_{GV,N}$ are arranged to each other in a current robot arm configuration, the easier it is to execute the rotation about the tool center point.

Considering application scenarios of the robot arm in which the robot arm, including the effector E, is used to execute manipulations of an object on and/or above a working surface (such as a table top) in the immediate environment of the robot body (within the working range of the robot), the proposed robot arm advantageously enables a simple rotation around the tool center point. This means that this rotation is largely possible as a result of the movement of the wrist alone, such that it is not necessary to move the entire robot arm for a desired movement in the task space.

Overall, the "wrist" of the proposed robot arm and/or the entire robot arm enables, due to the effective projection of the external forces and torques into the joint torques, an improved detection of acting external forces and torques, and particularly—for a manual guidance of the wrist, by way of example for direct input (patterning, teaching) of movement processes—an improved handling of objects, particularly for work on and/or above a work surface, and finally an improved and finer control of object manipulations, and for collision avoidance of the robot arm with objects in an environment.

An advantageous development of the robot arm is characterized in that the robot arm is designed in such a manner that, in each robot arm configuration, a projection of the axis of rotation $R_{GV,N}$ (projected axis of rotation $R_{GV,N}$*) onto a plane spanned by axes of rotation $R_{GV,N-2}$ and $R_{GV,N-1}$ forms an angle in the range from 50 to 130° with the axis of rotation $R_{GV,N-1}$.

An advantageous development of the robot arm is characterized in that the axis of rotation $R_{GV,N-2}$ and the axis of rotation $R_{GV,N-1}$ form an angle of 90°, and/or the projection of the axis of rotation $R_{GV,N}$ (projected axis of rotation $R_{GV,N}$*) onto the plane spanned by the axes of rotation $R_{GV,N-2}$ and $R_{GV,N-1}$ forms an angle of 90° with the axis of rotation $R_{GV,N-1}$. Tolerances of ±2° or ±5° advantageously apply for the indicated angles—in particular, for the angle of 90°.

An advantageous development of the robot arm is characterized in that the spacing D1 is selected to be in the range from 10 mm to 50 cm, and advantageously 15 mm, 20 mm, 50 mm, 75 mm, 1 cm, 5 cm, 10 cm, 15 cm, 20 cm, 25 cm, 30 cm, 35 cm, 40 cm, or 45 cm.

An advantageous development of the robot arm is characterized in that the axes of rotation $R_{GV,N-2}$ and $R_{GV,N-1}$ form an angle of 90°, and/or the projection of the axis of rotation $R_{GV,N}$ onto the plane spanned by the axes of rotation $R_{GV,N-2}$ and $R_{GV,N-1}$ forms an angle of 90° with the axis of rotation $R_{GV,N-1}$.

An advantageous development of the robot arm is characterized in that the section of the robot arm comprising the joint connections $GV_{N-2}$, $GV_{N-1}$ and $GV_N$, the arm links $GL_{N-2}$ and $GL_{N-1}$, and the effector E mounted on the joint connection $GV_N$ is designed in such a manner that a movement of the arm links $GL_{N-1}$ and the effector E about the axis of rotation $R_{GV,N-1}$ is possible without hindrance in any pose.

An advantageous development of the robot arm is characterized in that the joint connection $GV_N$ has a sensor for detecting a force or torque about the axis of rotation $R_{GV,N}$, and/or the joint connection $GV_{N-2}$ has a sensor for detecting a force or torque about the axis of rotation $R_{GV,N-2}$. Particularly advantageously, all joint connections $GV_n$ are designed for detecting forces and/or torques about their respective axes of rotation $R_{GV,n}$. This enables a more accurate detection of dynamically acting internal and external forces and torques of the robot arm, which improves, for example, a control of the robot arm and a collision detection along the robot arm—for example, supported by appropriate model-based estimation methods.

An advantageous development of the robot arm is characterized in that the robot arm is designed in such a manner that the axes of rotation $R_{GV1}$ and $R_{GV2}$ intersect at an angle in the range from 50 to 130°, the axes of rotation $R_{GV2}$ and $R_{GV3}$ intersect at an angle in the range from 50 to 130°, the axis of rotation $R_{GV4}$ is arranged radially at a constant spacing D2 from the axis of rotation $R_{GV3}$, and the axes of rotation $R_{GV4}$ and $R_{GV5}$ intersect at an angle in the range from 50 to 130°.

An advantageous development of the robot arm is characterized in that the robot arm is designed in such a manner that the axes of rotation $R_{GV1}$ and $R_{GV2}$ intersect at an angle in the range from 50 to 130°, the axes of rotation $R_{GV2}$ and $R_{GV3}$ intersect at an angle in the range from 50 to 130°, the axes of rotation $R_{GV3}$ and $R_{GV4}$ intersect at an angle in the range from 50 to 130°, and the axis of rotation $R_{GV5}$ is arranged radially at a spacing D3 from the axis of rotation $R_{GV4}$.

An advantageous development of the robot arm is characterized in that the robot arm is designed in such a manner that the axes of rotation $R_{GV1}$ and $R_{GV2}$ intersect at an angle in the range from 50 to 130°, the axes of rotation $R_{GV2}$ and $R_{GV3}$ intersect at an angle in the range from 50 to 130°, the axis of rotation $R_{GV4}$ is arranged radially at a constant spacing D4 from the axis of rotation $R_{GV3}$, and the axis of rotation $R_{GV5}$ is arranged at a spacing D5 from the axis of rotation $R_{GV4}$.

The above developments relate in particular to the structural design of the robot arm, starting from its proximal end. The different structural variants of the robot arm proposed above are to be selected depending on the purpose and task, and enable optimal detection of external forces and torques acting along the robot arm, as well as a sensitive execution of movements.

According to the second aspect of the invention, the invention relates to a robot wrist, having three actuator-drivable wrist joint connections $HGV_n$ which are connected in series via two wrist links $HGL_i$, where n=1, 2, 3 and i=1, 2, wherein the proximal wrist link $HGL_1$ of the robot wrist can be connected to a robot arm via the wrist joint connection $HGV_1$, the distal wrist link $HGL_2$ of the robot wrist can be connected via the wrist joint connection $HGV_3$ to an effector E, the wrist links $HGL_2$ and $HGL_1$ are connected via the wrist joint connection $HGV_2$, and each of the wrist joint connections $HGV_1$, $HGV_2$, $HGV_3$ enables a movement about a wrist axis of rotation $HR_{GV,1}$, $HR_{GV,2}$, $HR_{GV,3}$ assigned to the same.

The proposed robot wrist is characterized in that the robot wrist is designed such that the wrist axes of rotation $HR_{HGV,1}$ and $HR_{HGV,2}$ intersect at an angle in the range from 50 to 130° or the wrist axes of rotation $HR_{HGV,1}$ and $HR_{HGV,2}$ have a minimum spacing A1 in the range from 1 to 20 mm from each other, the wrist axis of rotation $HR_{HGV,3}$ is arranged radially at a constant spacing D1 from the wrist axis of rotation $HR_{HGV,2}$, and a sensor for detecting a force or a torque about the wrist axis of rotation $HR_{HGV,2}$ is present in the wrist joint connection $HGV_2$.

The proposed robot wrist enables a three-dimensional orientation of the effector E. A robot arm which can be connected to the robot wrist also enables a three-dimensional positioning of the wrist and/or the effector E in a working space of the robot (robot arm and robot wrist and effector E). The robot wrist, consisting of the distal three wrist joint connections, enables sensitive interaction with humans and/or objects, and/or the handling of objects, wherein the wrist is designed—as a result of the arrangement of the wrist axes of rotation according to the invention, and a sensor being advantageously present in the wrist—in such a manner that a sensitive detection of external forces/torques is possible about all of the three axes, and also a high degree of mobility is possible largely due entirely to the simple reconfiguration of the wrist. Both properties can be particularly well utilized for handling objects in a working space on and/or above, by way of example, a tabletop work surface.

An advantageous development of the robot wrist is characterized in that the robot wrist is designed in such a manner that a projection of the wrist axis of rotation $HR_{HGV,3}$ onto a plane spanned by the wrist axes of rotation $HR_{HGV,1}$ and $HR_{HGV,2}$ forms an angle in the range from 50 to 130° with the wrist axis of rotation $HR_{HGV,2}$.

An advantageous development of the robot wrist is characterized in that the robot wrist is designed in such a manner that the wrist axes of rotation $HR_{HGV,1}$ and $HR_{HGV,2}$ form an angle of 90°, and/or the projection of the wrist axis of rotation $HR_{HGV,3}$ onto the plane spanned by the wrist axes of rotation $HR_{HGV,1}$ and $HR_{HGV,2}$ forms an angle of 90° with the wrist axis of rotation $HR_{HGV,2}$.

An advantageous development of the robot wrist is characterized in that the robot wrist is designed in such a manner that the wrist joint connections $HGV_1$, $HGV_2$, $HGV_3$, the wrist links $HGL_1$ and $HGL_2$, and the effector E mounted on the wrist joint connection $HGV_3$ are designed in such a manner that a movement of the wrist link $HGL_2$ and the effector E about the wrist axis of rotation $HR_{HGV,2}$ is possible without hindrance in all poses of the robot arm.

An advantageous development of the robot wrist is characterized in that the robot wrist is designed in such a manner that the wrist joint connection $HGV_3$ is designed for detecting a force or a torque about the wrist axis of rotation $HR_{HGV,3}$, and/or the wrist joint connection $HGV_1$ is designed for detecting a force or a torque about the wrist axis of rotation $HR_{HGV,1}$.

Advantages of the robot wrist and advantageous developments of the robot wrist result from a corresponding and analogous application of the statements made above in reference to the proposed robot arm.

Finally, the invention relates to a robot, having a robot arm as described above.

Further advantages, features and details will become apparent from the following description, in which—where appropriate, with reference to the drawings—at least one embodiment is described in detail. The same, similar and/or functionally identical parts are indicated by the same reference numerals.

FIG. 1 shows a highly schematic structure of a robot arm according to the invention, with six degrees of freedom. The robot arm has six actuator-drivable joint connections $GV_n$, which are connected in series via arm links $GL_i$, where n=1, 2, ..., 6, and i=1, 2, ..., 5. The proximal arm link $GL_1$ of the robot arm is connected via the joint connection $GV_1$ to a robot body RK. The distal arm link $GL_5$ of the robot arm is connected via the joint connection $GV_6$ to an effector E. The effector E can be arranged directly on the joint connection $GV_6$ or on an adapter connected to the joint connection $GV_6$. Each of the joint connections $GV_4$, $GV_5$, $GV_6$ enables a movement about an axis of rotation $R_{GV,4}$, $R_{GV,5}$, $R_{GV,6}$ assigned to the same. The portion of the robot arm in the dashed-line box forms the robot wrist. The arm links $GL_1$, $GL_2$ and $GL_3$ have a greater longitudinal extent than the arm links $GL_4$, $GL_5$ and the effector E.

Figure 2:
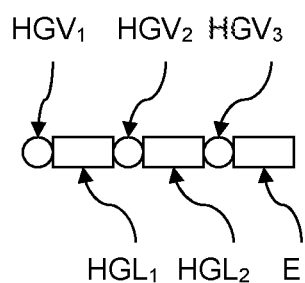
FIG. 2 shows a highly schematic structure of a robot wrist according to the invention.

FIG. 2 shows a highly schematized structure of a robot wrist joint according to the invention, having three actuator-drivable wrist joint connections $HGV_n$, which are connected in series via two wrist links $HGL_i$, where n=1, 2, 3 and i=1, 2.

The proximal wrist link $HGL_1$ of the robot wrist is connected to a robot arm via the wrist joint connection $HGV_1$. The distal wrist link $HGL_2$ of the robot wrist is connected to an effector E via the wrist joint connection $HGV_3$. The wrist links $HGL_2$ and $HGL_1$ are connected via the wrist joint connection $HGV_2$. Each of the wrist joint connections $HGV_1$, $HGV_2$, $HGV_3$ enables a movement about a wrist axis of rotation $HR_{GV,1}$, $HR_{GV,2}$, $HR_{GV,3}$ assigned to the same, and thus a three-dimensional orientation of the effector E in space.

Figure 3:
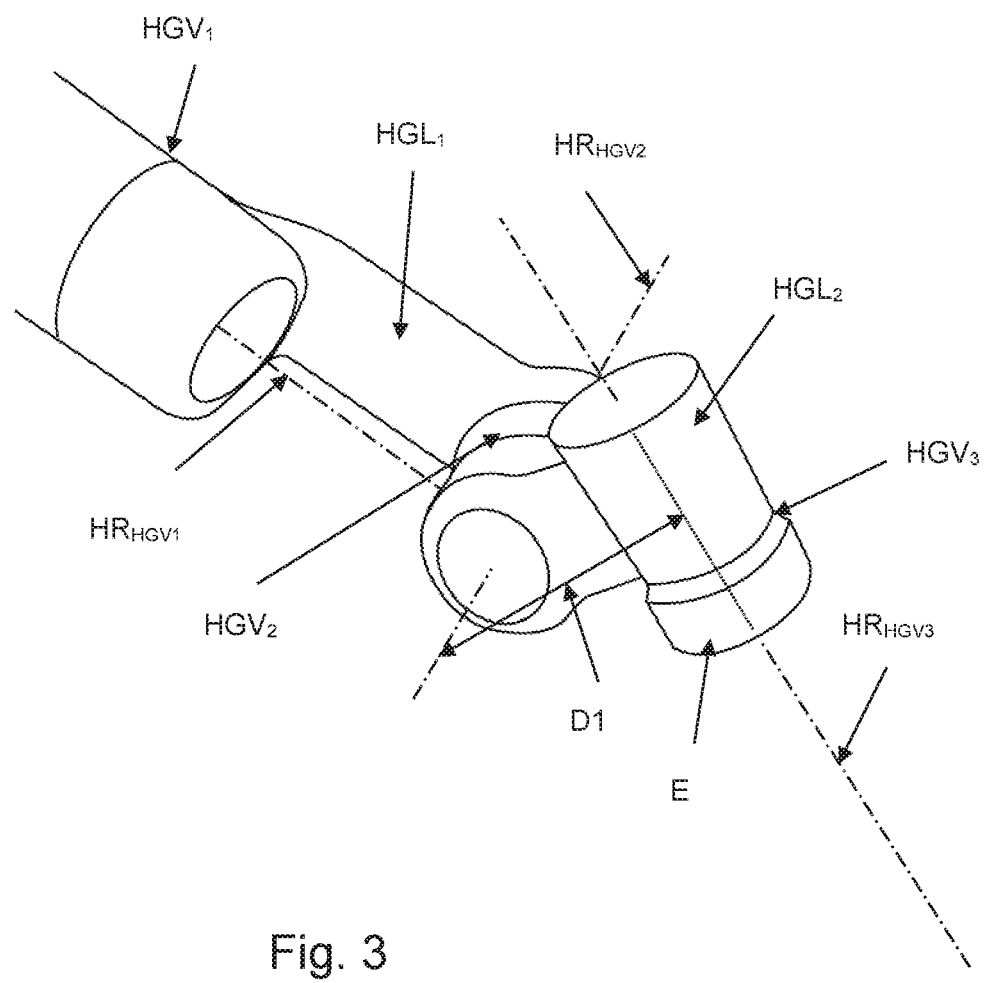
FIG. 3 shows a representation of an embodiment of a robot wrist joint according to the invention, on a robot arm; and, FIG. 4 shows a representation of an embodiment of a robot wrist joint on a robot arm, according to an exemplary embodiment of the invention.
Figure 4:
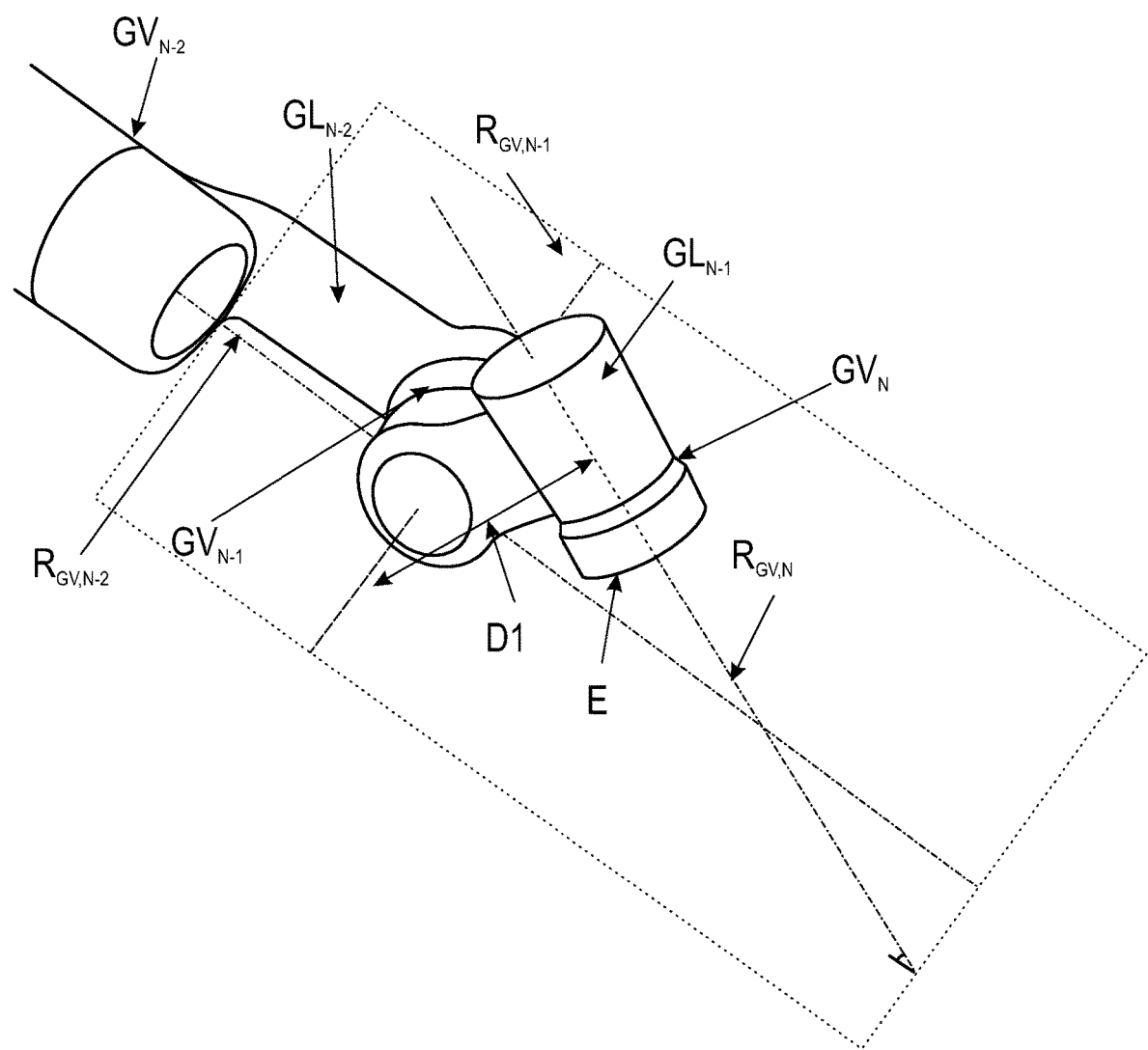

FIG. 3 shows an illustration of an embodiment of a robot wrist according to the invention, on a robot arm. The illustrated robot wrist comprises three actuator-drivable wrist joint connections $HGV_1$, $HGV_2$ and $HGV_3$ which are connected in series via two wrist links $HGL_1$ and $HGL_2$. The proximal wrist link $HGL_1$ of the robot wrist is connected to a robot arm via the wrist joint connection $HGV_1$. The distal wrist link $HGL_2$ of the robot wrist can be connected via the wrist joint connection $HGV_3$ to an effector E (not shown).

The wrist links $HGL_2$ and $HGL_1$ are connected via the wrist joint connection $HGV_2$. Each of the wrist joint connections $HGV_1$, $HGV_2$, $HGV_3$ enables a movement about a wrist axis of rotation $HR_{HGV,1}$, $HR_{HGV,2}$, $HR_{HGV,3}$ assigned to the same, and thus a three-dimensional orientation of the effector E in space.

The robot wrist is designed in such a manner that the wrist axes of rotation $HR_{HGV,1}$ and $HR_{HGV,2}$ intersect at an angle in the range of 90°, and the wrist axis of rotation $HR_{HGV,3}$ has, for any arbitrary configuration of the robot hand joint, a radially constant spacing D1 from the wrist axis of rotation $HR_{HGV,2}$. In addition, a sensor for detecting a force or a torque about the respective wrist axis of rotation $HR_{HGV,1}$, $HR_{HGV,2}$, $HR_{HGV,3}$ is present in all of the wrist joint connections $HGV_1$, $HGV_2$ and $HGV_3$.

The invention claimed is:

1. A robot arm, having a number N of actuator-drivable joint connections $GV_n$, which are connected in series via arm links $GL_i$, where n=1, 2, . . . , N, and i=1, 2, . . . , N−1, and N≥6, wherein
the proximal arm link $GL_1$ of the robot arm can be connected to a robot body (RK) via the joint connection $GV_1$,
the distal arm link $GL_{N-1}$ of the robot arm can be connected to an effector (E) via the joint connection $GV_N$,
the arm links $GL_{N-1}$ and $GL_{N-2}$ are connected via the joint connection $GV_{N-1}$, and the arm links $GL_{N-2}$ and $GL_{N-3}$ are connected via the joint connection $GV_{N-2}$, and
each of the joint connections $GV_N$, $GV_{N-1}$, $GV_{N-2}$ enables a movement about an axis of rotation $R_{GV,N}$, $R_{GV,N-1}$, $R_{GV,N-2}$ respectively corresponding to the joint connections $GV_N$, $GV_{N-1}$, $GV_{N-2}$,
characterized in that the robot arm is designed in such a manner that
the axes of rotation $R_{GV,N-2}$ and $R_{GV,N-1}$ intersect at an angle in the range from 50 to 130°,
the axis of rotation $R_{GV,N}$ is arranged radially at a constant spacing (D1) from the axis of rotation $R_{GV,N-1}$, wherein the spacing (D1) is selected to be in the range from 1 to 50 cm, and
the joint connection $GV_{N-1}$ is adapted for detecting a force or torque about the axis of rotation $R_{GV,N-1}$.

2. The robot arm according to claim 1, characterized in that the robot arm is designed in such a manner that a projection of the axis of rotation $R_{GV,N}$ onto a plane spanned by the axes of rotation $R_{GV,N-2}$ and $R_{GV,N-1}$ forms an angle in the range from 50 to 130° with the axis of rotation $R_{GV,N-1}$.

3. The robot arm according to claim 1, characterized in that the axes of rotation $R_{GV,N-2}$ and $R_{GV,N-1}$ form an angle of 90°, and/or a projection of the axis of rotation $R_{GV,N}$ onto a plane spanned by the axes of rotation $R_{GV,N-2}$ and $R_{GV,N-1}$ forms an angle of 90° with the axis of rotation $R_{GV,N-1}$.

4. The robot arm according to claim 1, characterized in that a section of the robot arm comprising the joint connections $GV_{N-2}$, $GV_{N-1}$, and $GV_N$, the arm links $GL_{N-2}$ and $GL_{N-1}$, and the effector (E), mounted on the joint connection $GV_N$ is designed in such a manner that a movement of the arm links $GL_{N-1}$ and the effector (E) about the axis of rotation $R_{GV,N-1}$ is possible without hindrance in all poses of the robot arm.

5. The robot arm according to claim 4, characterized in that the joint connection $GV_N$ is adapted for detecting a force or a torque about the axis of rotation $R_{GV,N}$, and/or the joint connection $GV_{N-2}$ is adapted for detecting a force or a torque about the axis of rotation $R_{GV,N-2}$.

6. The robot arm according to claim 5, characterized in that the robot arm is designed in such a manner that
the axes of rotation $R_{GV,N=1}$ and $R_{GV,N=2}$ intersect at an angle in the range from 50 to 130°,
the axes of rotation $R_{GV,N=2}$ and $R_{GV,N=3}$ intersect at an angle in the range from 50 to 130°,
the axis of rotation $R_{GV,N=4}$ is arranged radially at a constant spacing (D2) from the axis of rotation $R_{GV,N=3}$, and
the axes of rotation $R_{GV,N=4}$ and $R_{GV,N=5}$ intersect at an angle in the range from 50 to 130°.

7. The robot arm according to claim 5, characterized in that the robot arm is designed in such a manner that
the axes of rotation $R_{GV,N=1}$ and $R_{GV,N=2}$ intersect at an angle in the range from 50 to 130°,
the axes of rotation $R_{GV,N=2}$ and $R_{GV,N=3}$ intersect at an angle in the range from 50 to 130°,
the axes of rotation $R_{GV,N=3}$ and $R_{GV,N=4}$ intersect at an angle in the range from 50 to 130°,
the axis of rotation $R_{GV,N=5}$ is arranged radially at a spacing (D3) from the axis of rotation $R_{GV,N=4}$.

8. The robot arm according to claim 5, characterized in that the robot arm is designed in such a manner that
the axes of rotation $R_{GV,N=1}$ and $R_{GV,N=2}$ intersect at an angle in the range from 50 to 130°,
the axes of rotation $R_{GV,N=2}$ and $R_{GV,N=3}$ intersect at an angle in the range from 50 to 130°,
the axis of rotation $R_{GV,N=4}$ is arranged radially at a constant spacing (D4) from the axis of rotation $R_{GV,N=3}$, and
the axis of rotation $R_{GV,N=5}$ is arranged radially at a spacing (D5) from the axis of rotation $R_{GV,N=4}$.

9. The robot arm according to claim 1, characterized in that the joint connection $GV_N$ is adapted for detecting a force or a torque about the axis of rotation $R_{GV,N}$, and/or the joint connection $GV_{N-2}$ is adapted for detecting a force or a torque about the axis of rotation $R_{GV,N-2}$.

10. The robot arm according to claim 1, characterized in that the robot arm is designed in such a manner that
the axes of rotation $R_{GV,N=1}$ and $R_{GV,N=2}$ intersect at an angle in the range from 50 to 130°,
the axes of rotation $R_{GV,N=2}$ and $R_{GV,N=3}$ intersect at an angle in the range from 50 to 130°,
the axis of rotation $R_{GV,N=4}$ is arranged radially at a constant spacing (D2) from the axis of rotation $R_{GV,N=3}$, and
the axes of rotation $R_{GV,N=4}$ and $R_{GV,N=5}$ intersect at an angle in the range from 50 to 130°.

11. The robot arm according to claim 1, characterized in that the robot arm is designed in such a manner that
the axes of rotation $R_{GV,N=1}$ and $R_{GV,N=2}$ intersect at an angle in the range from 50 to 130°,
the axes of rotation $R_{GV,N=2}$ and $R_{GV,N=3}$ intersect at an angle in the range from 50 to 130°,
the axes of rotation $R_{GV,N=3}$ and $R_{GV,N=4}$ intersect at an angle in the range from 50 to 130°,
the axis of rotation $R_{GV,N=5}$ is arranged radially at a spacing (D3) from the axis of rotation $R_{GV,N=4}$.

12. The robot arm according to claim 1, characterized in that the robot arm is designed in such a manner that the axes of rotation $R_{GV,N=1}$ and $R_{GV,N=2}$ intersect at an angle in the range from 50 to 130°, the axes of rotation $R_{GV,N=2}$ and $R_{GV,N=3}$ intersect at an angle in the range from 50 to 130°, the axis of rotation $R_{GV,N=4}$ is arranged radially at a constant spacing (D4) from the axis of rotation $R_{GV,N=3}$, and the axis of rotation $R_{GV,N=5}$ is arranged radially at a spacing (D5) from the axis of rotation $R_{GV,N=4}$.

13. A robot, having a robot arm according to claim 1.

14. A robot wrist, having three actuator-drivable wrist joint connections $HGV_n$, which are connected in series via two wrist links $HGL_i$, where n=1, 2, 3 and i=1, 2, wherein the proximal wrist link $HGL_1$ of the robot wrist can be connected to a robot arm via the wrist joint connection $HGV_1$, the distal wrist link $HGL_2$ of the robot wrist can be connected to an effector (E) via the wrist joint connection $HGV_3$, the wrist links $HGL_2$ and $HGL_1$ are connected via the wrist joint connection $HGV_2$, and each of the wrist joint connections $HGV_1$, $HGV_2$, $HGV_3$ enables a movement about a wrist axis of rotation $HR_{HGV,1}$, $HR_{HGV,2}$, $HR_{HGV,3}$ respectively corresponding to the wrist joint connections $HGV_1$, $HGV_2$, $HGV_3$, characterized in that the robot wrist is designed in such a manner that the wrist axes of rotation $HR_{HGV,1}$ and $HR_{HGV,2}$ intersect at an angle in the range from 50 to 130°, the wrist axis of rotation $HR_{HGV,3}$ is arranged radially at a constant spacing (D1) from the wrist axis of rotation $HR_{HGV,2}$, wherein the spacing (D1) is selected to be in the range from 1 to 50 cm and the wrist joint connection $HGV_2$ is designed for detecting a force or a torque about the wrist axis of rotation $HR_{HGV,2}$.

15. The robot wrist according to claim 14, characterized in that the robot wrist is designed in such a manner that a projection of the wrist axis of rotation $HR_{HGV,3}$ onto a plane spanned by the wrist axes of rotation $HR_{HGV,1}$ and $HR_{HGV,2}$ forms an angle in the range from 50 to 130° with the wrist axis of rotation $HR_{HGV,2}$.

16. Robot wrist according to claim 14, characterized in that the wrist axes of rotation $HR_{HGV,1}$ and $HR_{HGV,2}$ form an angle of 90°, and/or a projection of the wrist axis of rotation $HR_{HGV,3}$ onto a plane spanned by the wrist axes of rotation $HR_{HGV,1}$ and $HR_{HGV,2}$ forms an angle of 90° with the wrist axis of rotation $HR_{HGV,2}$.

17. Robot wrist according to claim 14, characterized in that the wrist joint connections $HGV_1$, $HGV_2$, $HGV_3$, the wrist links $HGL_1$ and $HGL_2$, and the effector (E) mounted on the wrist joint connection $HGV_3$ are designed in such a manner that a movement of the wrist link $HGL_2$ and the effector (E) about the wrist axis of rotation $HR_{HGV,2}$ is possible without hindrance in all poses of the wrist.

18. Robot wrist according to claim 14, characterized in that the wrist joint connection $HGV_3$ is designed for detecting a force or a torque about the wrist axis of rotation $HR_{HGV,3}$, and/or the wrist joint connection $HGV_1$ is designed for detecting a force or a torque about the wrist axis of rotation $HR_{HGV,1}$.

19. A robot, having a robot wrist according to claim 14.

* * * * *